March 22, 1949. T. D. BOWES ET AL 2,465,006
DYNAMOELECTRIC MACHINE TRANSMISSION UNIT
Filed Dec. 3, 1943 4 Sheets-Sheet 1
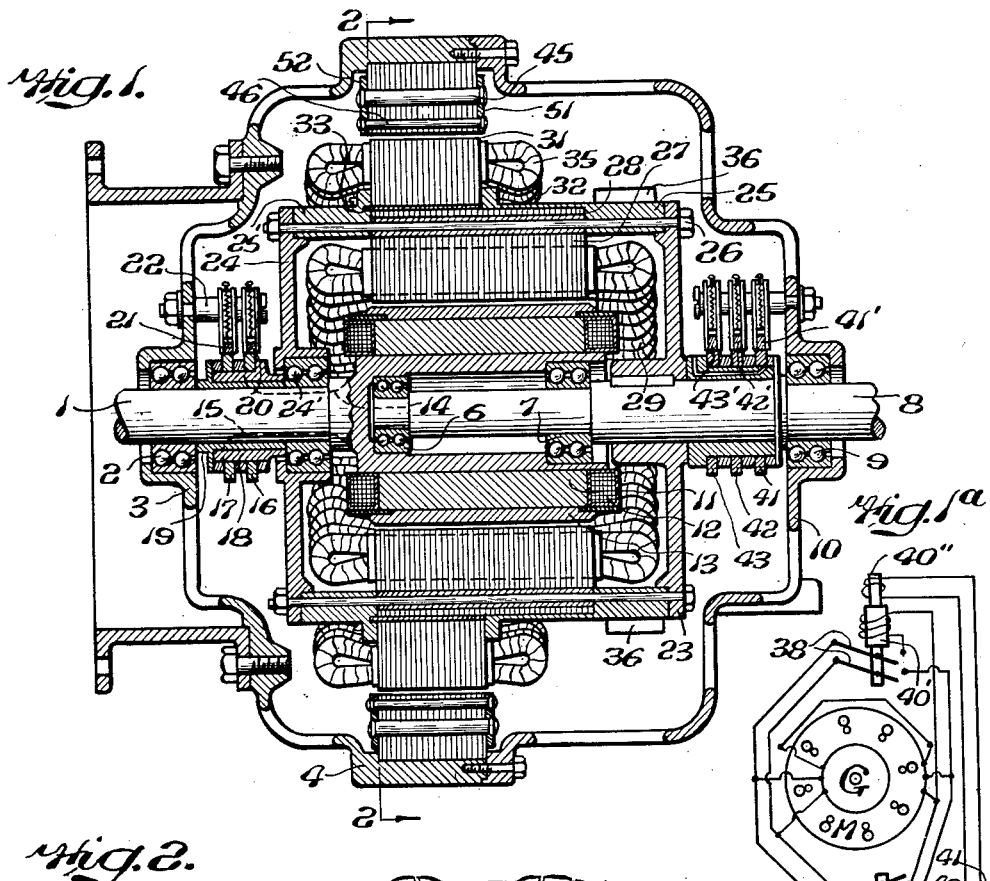
Fig.1.
Fig.1a.
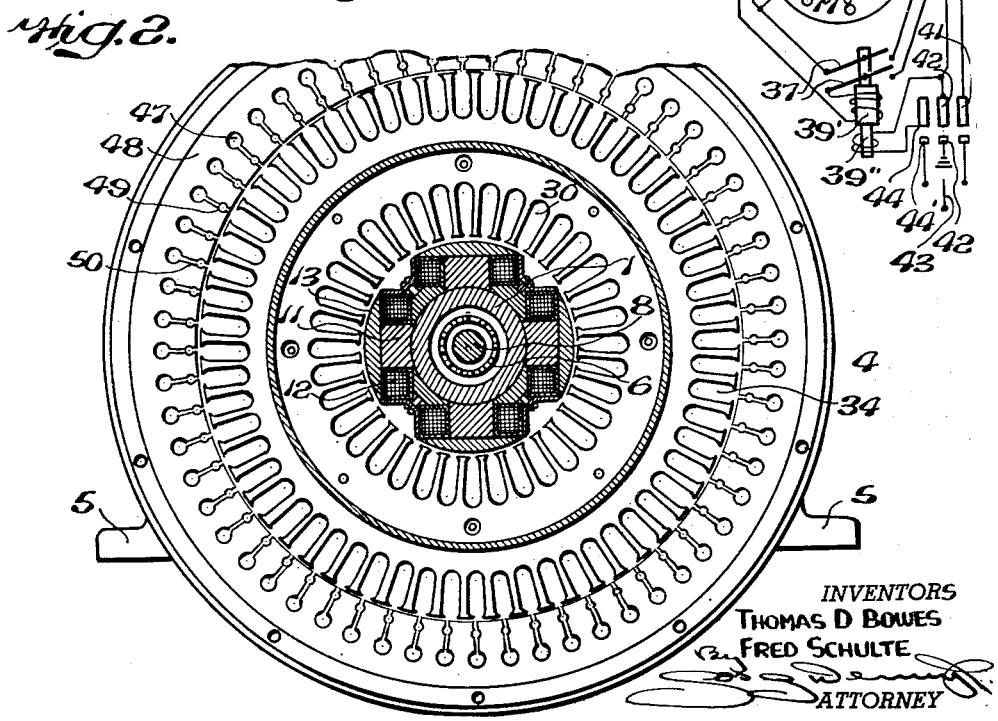
Fig.2.
INVENTORS
THOMAS D BOWES
FRED SCHULTE
ATTORNEY March 22, 1949. T. D. BOWES ET AL 2,465,006
DYNAMOELECTRIC MACHINE TRANSMISSION UNIT
Filed Dec. 3, 1943 4 Sheets-Sheet 2
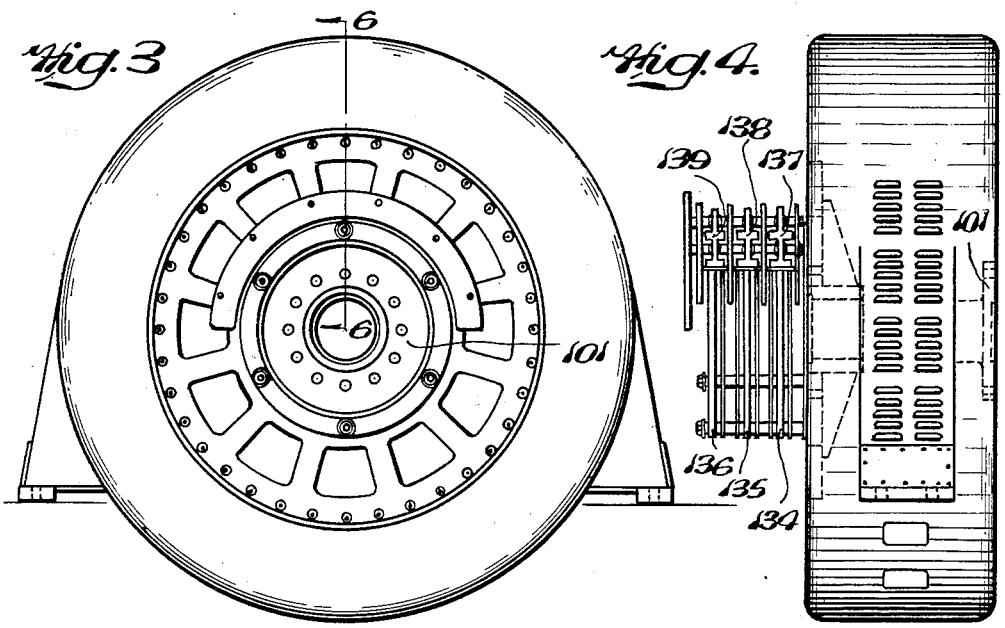
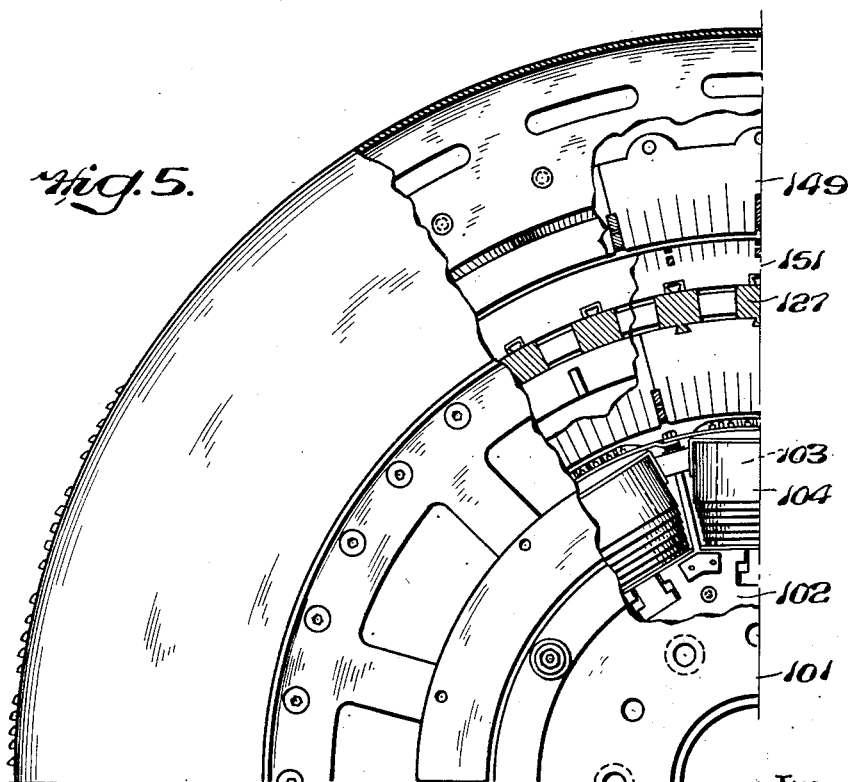
INVENTORS
THOMAS D BOWES
FRED SCHULTE
BY
ATTORNEY March 22, 1949.  T. D. BOWES ET AL  2,465,006
DYNAMOELECTRIC MACHINE TRANSMISSION UNIT
Filed Dec. 3, 1943  4 Sheets-Sheet 3
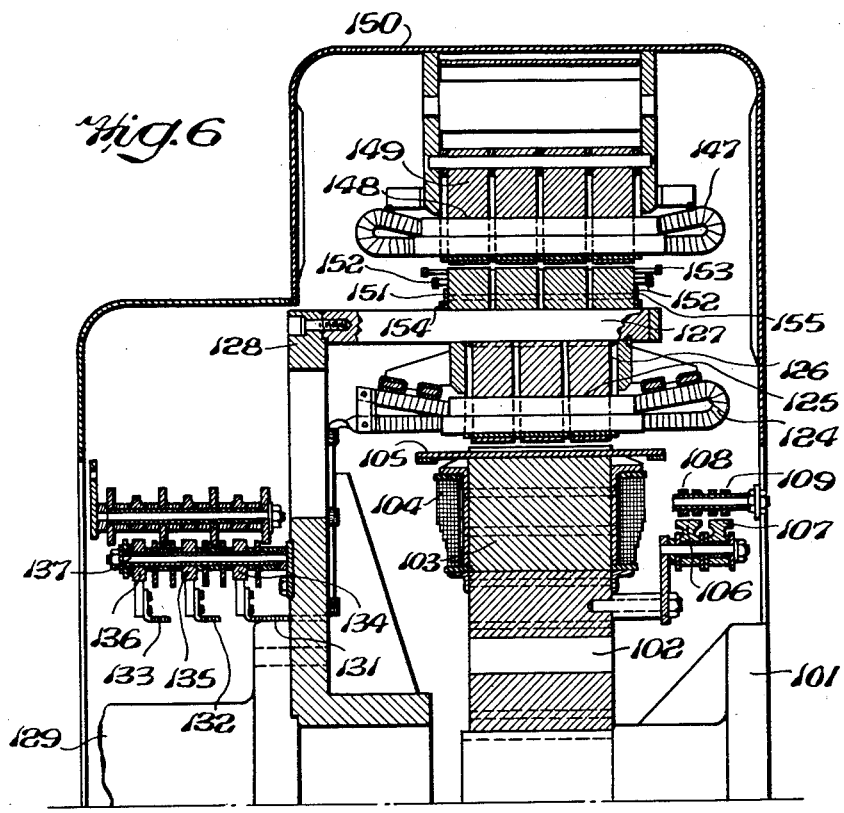
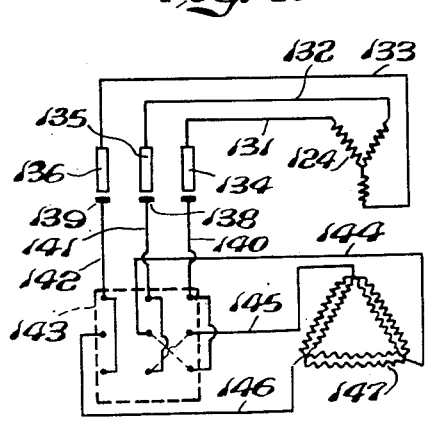
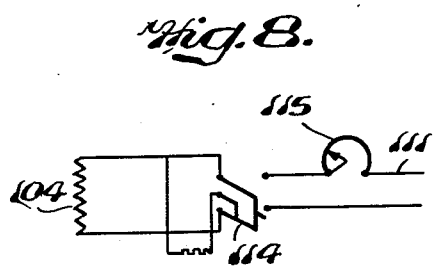
INVENTORS
THOMAS D. BOWES
FRED SCHULTE
BY
ATTORNEY

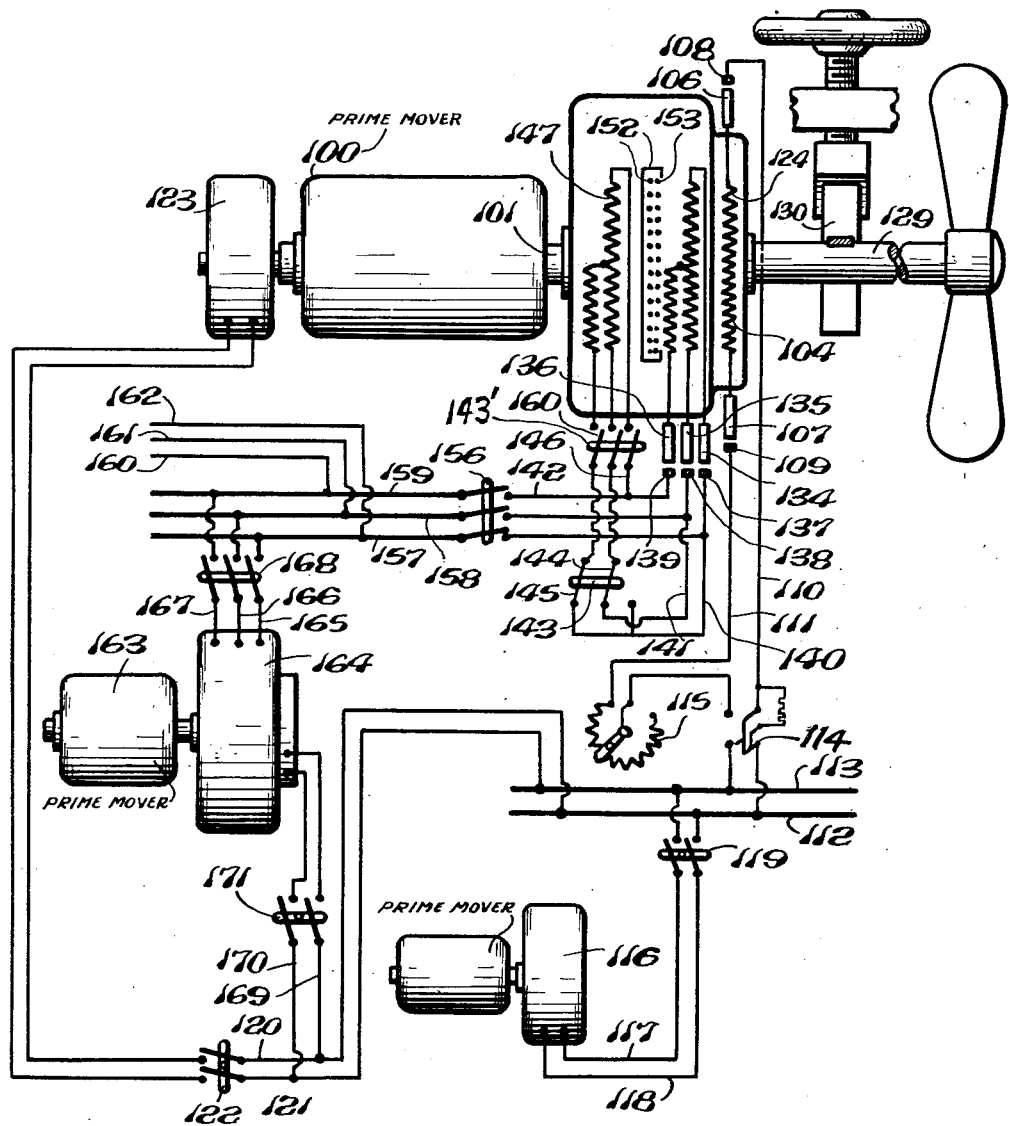

Patented Mar. 22, 1949

2,465,006

UNITED STATES PATENT OFFICE 2,465,006

DYNAMOELECTRIC MACHINE TRANSMISSION UNIT

Thomas D. Bowes, Cynwyd, and Fred Schulte, Philadelphia, Pa.; said Schulte assignor to said Bowes Application December 3, 1943, Serial No. 512,712

20 Claims. (Cl. 172—284)

Our invention relates to improvements in dynamoelectric machine transmission units and is designed primarily to permit the efficient utilization of the kinetic energy of a high speed rotor for the performance of mechanical work at an angular speed lower than and at a torque higher than those of the driving rotor, and to maintain a substantially constant proportional relation between the speed of the driving member and the speed of the driven member under continuous duty.

In a preferred embodiment of our invention, the direction of angular movement of the driven member, or body upon which the work is done, may be selectively the same as, or opposite to, the angular direction of movement of the driving rotor.

Our invention is especially applicable to the propulsion of ships, locomotives, and other vehicles equipped with power plants, such as Diesel engines, gas turbines, or high speed steam turbines, having a normal efficient running speed too high for efficient application directly to a propeller shaft or other propulsive mechanism. In its preferred form, it permits the efficient application, at a reduced rate of speed, of the energy developed by unidirectional prime movers to either forward or reverse movement of the ship, vehicle, or driven body without the interposition of reversing gears or of mechanical speed reducers, such as reduction gearing or friction drives.

While our invention is particularly designed as a propulsion system for ships or vehicles having a unidirectional prime mover, certain of the features of our invention are of marked utility for a wide variety of purposes, which will be apparent from a consideration of the characteristics and attributes thereof.

In accordance with our invention, a part of the kinetic energy of a rotor is directly transmitted to a driven member magnetically and the remainder of such energy is converted into electricity and transmitted to such driven member electro-kinetically so that the electro-kinetic force applied to the driven member controls the speed and direction of rotation thereof.

In a preferred embodiment of our invention, the driving rotor member is mechanically free from but magnetically coupled to a driven member by magnetic flux between elements fixed to the respective members but exerting a pull or drag insufficient to transmit the bulk of the kinetic energy of the driving rotor and insufficient to prevent a speed difference between the respective elements. The consequent speed difference results in the cutting of the lines of magnetic force and causes the elements to function as a generator to generate current in conducting elements of at least one of the members. The rate of speed difference or slip between the respective rotary elements of the magnetic clutch-generator is preferably maintained constantly greater than the rate of rotation desired in the driven member, and the energy of the current which is generated with a given rate of slip between elements and a given flux density is generally greater than the kinetic energy which is transmitted magnetically between such elements by such flux density.

The electric energy of the current so generated is reconverted into mechanical energy through an electric motor having a rotor mechanically connected with the driven member to which the driven member of the magnetic clutch is mechanically connected. The motor exerts energy and torque governing the energy and torque transmissible through the magnetic coupling elements. The motor's angular speed under maximum power transmissible from the generator is slower than the angular speed of the driving rotor and is preferably substantially constant under continuous duty, although, instead of a constant speed motor, there may be used a multi-speed motor operable at any one of two or more definite speeds, each being practically independent of the load.

In apparatus for the efficient utilization of the principles of our invention in a propulsion system, the generator is preferably provided with such number of active poles as will result in the production of alternating current within a range of frequencies which are practicable and desirable whether the magnetic flux is cut at a rate proportional to (a) the slip speed; viz., the difference between the normal rate of rotation of the rotor of a unidirectional prime mover and a predetermined or desired rate of forward rotation of the driven shaft; or (b) the normal rate of rotation of such rotor per se; or (c) the normal rate of rotation of such rotor plus the reverse rate of rotation of the driven shaft during reversing.

Using such frequencies as a basis of computation, the motor may then be designed with such number of poles as will cause its operation at the predetermined forward speed desired in the driven shaft. The speed ratio between the forward speed of the driven member and the speed of the driving rotor will then remain substantially constant regardless of variations in the speed of the latter, since the frequencies of the current generated will vary with changes in the rate of slip resulting from variations in the speed of the driving rotor, and the rate of speed of the motor (and hence of the driven shaft) will vary with changes in the frequencies of the current supplied thereto. This results from the principles that $$f = \frac{sp}{120}; \quad p = f \times \frac{120}{s}; \quad s = \frac{120f}{p}$$

where $f$ is frequency, $p$ is number of poles and $s$ is R. P. M. between the elements of a synchronous generator or between the elements of a synchronous motor or the induced field speed of an induction motor.

When the apparatus is so designed as to maintain a constant ratio between the forward speed of the driven shaft and the driving rotor, the reversing speed of the driven shaft will, of course, be higher than the forward speed thereof due to the higher frequencies generated under condition (c) supra. In some cases, the desired reversing speed of the driven shaft, instead of the forward speed thereof, may be used as a basis for calculating the ratio between the number of poles of the generator and motor.

The construction and relation of the motor elements are such that the E. M. F. per revolution of the motor, when operating at or about the output voltage of the generator, is properly matched with, and preferably greater than, the E. M. F. per revolution of the generator. Should the output current of the generator be transformed to a higher or lower voltage, the construction and relation of the elements of the motor and generator are such that the wattage generated per slip revolution of the generator is transformed into mechanical energy in a partial revolution of the motor rotor and the driven member torque is greater than that exerted by the magnetic drag between the magnetic clutch elements.

The number and characteristics of the motor elements suitable for efficient use with a given generator at the generator output voltage may be readily determined, or varied relatively to one another, by those skilled in the art, to secure a desired ratio between the energy transmitted magnetically and the energy transmitted electrokinetically; to secure a desired ratio between the relative speed of the motor and the slip-speed of the generator; and to secure a desired ratio between the torque of the motor and the torque of the magnetic clutch.

The construction and windings per se of constant speed motors having a speed of normal operation which is constant or practically constant substantially independent of the load under continuous duty may be widely varied. Examples of such constant speed motors are synchronous motors, induction motors with small slip, or ordinary direct current compound wound or shunt wound motors. Similarly there are numerous types of multi speed motors which are useable in our invention and which are operable at any one of two or more definite speeds each practically independent of the load under constant duty conditions. Examples of such multi-speed motors are induction motors with windings capable of various pole groupings or direct current motors with two-armature windings. More specific examples of types of motors suitable for use in our invention are squirrel cage motors (single or double); squirrel cage motors having a winding substituted for one of the cages of a double squirrel cage; high resistance squirrel cage motors with low resistance winding; high resistance squirrel cage motors with high resistance phase winding; double squirrel cage motors with choker; polyphase induction motors or single phase with starting winding; internal and external resistance motors; straight repulsion motors; combined repulsion start induction motors; slip ring motors; split phase motors; and all types of synchronous motors.

The generator used is preferably an independently excited alternator (synchronous generator) whose alternating current output is utilized to produce a rotary magnetic field in either the rotor or stator of an alternating current motor. The current may be transmitted from the generator to the motor solely by conductance or by conductance and inductive coupling. The connections of the motor may be reversed, to reverse the direction of rotation of the motor, by means of a solenoid-operable reverser carried by the driven member or by a fixed support; or the reversal of the motor, as well as a change in voltage and phase relation, may be effected through a transformer reverser.

The concurrent application of energy from a common source of limited output directly to a driven member magnetically, through a magnetic clutch, and electro-kinetically, through dynamo-electric mechanism of the character described exerting greater torque on the driven member than is transmissible thereto through the magnetic clutch, obviates the usual dissipation of substantial slip energy in heat or friction and permits the application to a driven member, moving in the same direction as the driving rotor and under substantially constant duty, of 90% or more of the kinetic energy of the driving rotor while maintaining a substantially constant ratio of speed reduction between the driving and driven members independently of variations in the speed of the driving rotor and substantially independently of variations in load on the driven member within the normal rated capacity of the equipment. Hence racing or retardation of a ship's propeller shaft in a rough sea or the racing or retardation of the operation of other equipment with variations in load is substantially obviated where the prime mover is provided with an efficient governor of known type.

By our invention, a large portion of the energy of the driving rotor may be transmitted to work in a direction opposite to the direction of rotation of the driving rotor electro-kinetically and without the interposition of reversing gears or mechanical friction devices. Such reversal may be accomplished by remote control through a reverser provided with means for preventing operation of the reversing switch during the generation of substantial current by the generator. The generation of current may be minimized by decreasing the excitation current supplied to the generator to permit the reversal of the polarity of the motor and, if desired, and adequate insulation is provided, the excitation current may be increased during reversing to provide a desired torque.

When the driving rotor and driven shaft are rotating in opposite directions, the increased rate of slip between the generator elements makes available electro-kinetically a substantially higher proportion of the total energy of the driving rotor than the difference between the proportions of its energy transmitted magnetically and electro-kinetically in the forward operation. For example, if the mechanism is so designed as to transmit magnetically one-third of the energy and to transmit electro-kinetically two-thirds of the energy of the driving rotor when the driven member is rotated in the forward direction, the reversal of the motor connections will so overload the prime mover that the energy exerted through the driving rotor to reverse the driven member (viz., cause its rotation oppositely to the rotation of the driving member) may be approximately four-thirds of the energy exerted through the driving rotor during forward propulsion.

The members of the dynamo electric machines comprised in our invention are preferably concentric with one another and axially telescoped or overlapped so as to minimize space, weight, cost and wiring, and to permit the mounting of the generator's driven rotor or armature and the motor rotor upon the same quill or mounting and the utilization of the radius of the generator to increase the "arm" through which the effective force of the motor is applied to the driven member.

The characteristic features and advantages of our invention will further appear from the following description and the accompanying drawings of illustrative embodiments thereof.

In the drawings, Fig. 1 is a longitudinal sectional view of one form of power transmission mechanism embodying our invention; Fig. 1a is a diagrammatic layout of a reverser whose elements may be symmetrically and accessibly mounted on a rotor of Fig. 1; Fig. 2 is a transverse sectional view taken substantially on the line 2—2 of Fig. 1, with parts broken away and omitted; Fig. 3 is an end view of a modified form of power transmission mechanism embodying our invention; Fig. 4 is a side elevation of the mechanism shown in Fig. 3; Fig. 5 is an enlarged fragmentary end view of a part of the mechanism shown in Fig. 3, with parts broken away; Fig. 6 is an enlarged fragmentary longitudinal sectional view of the mechanism shown in Fig. 3 taken substantially on the line 6—6 thereof; Fig. 7 is a schematic wiring diagram including a stationary reverser and its connections with the generator and motor for interchanging circuits to reverse the direction of motor rotation; Fig. 8 is a schematic wiring diagram of switch and rheostat mechanism connecting an exciter with the field of the generator; and Fig. 9 is a diagrammatic layout of a ship power plant including the power transmission mechanism of our invention.

In the embodiment of our invention illustrated in Figs. 1 and 2 of the drawings, a driving shaft 1 is rotatably mounted in an anti-friction bearing 2 fixed in the back plate 3 of a frame or housing 4 supported by feet 5. The outer end of the driving shaft 1 is operatively connected to a source of prime power, such as a Diesel engine or unidirectional turbine, and the inner end of the shaft 1 is recessed to receive anti-friction bearings 6 and 7 in which is seated or piloted the reduced inner end of a driven shaft 8 rotatably mounted in the anti-friction bearing 9 mounted in the front plate 10 of the frame 4.

The shaft 1 has mounted thereon a magnetic field structure or rotor of a polyphase synchronous generator having four salient poles 11 on which are mounted field coils 12 and pole shoes 13.

The field coils 12 may be D. C. excited from an external exciter through conductors 14 and 15 which are connected respectively with conducting rings 16 and 17 spaced by insulating rings and mounted on an insulating sleeve 18 of a flanged collar 19 fixed to the shaft 1. Spring biased brushes 20 and 21 engage the peripheries of the respective collector rings 16 and 17 and are mounted in brush holders insulatingly fixed to the arm 22 mounted on the back plate 3.

The driven shaft 8 has fixed thereto an armature rotor comprising a spider 23 splined on the shaft 8, a spider 24 supported through the anti-friction bearing 24' on the shaft 1, and interlocking cylindrical rings 25, 25' bolted together and to the spiders 23 and 24 by bolts 26 to provide a sleeve or quill for supporting a plurality of concentric sets of phase windings disposed within approximately the same axial zone and connected through circuits external to the phase groups which are comprised in and form parts of a pair of armatures.

One of the armatures is complementary to the generator field member and is mounted within the quill 25. It comprises a laminated core 27, composed of sheet steel discs secured by the bolts 26 in a perimetral channel 28 of the quill section 25, and polyphase windings 29 which are seated and secured in the open slots 30 of the core and insulated therefrom in the usual manner for the efficient generation of three-phase alternating current.

The other of the armatures carried by the quill 25 is a motor armature and is mounted exteriorly of the quill. It comprises a core 31, composed of sheet steel discs clamped between the flanges 32 and 33 of the quill sections 25, 25' and containing the open slots 34 for housing the three-phase armature windings 35 of a squirrel cage induction motor.

A lead of one of the motor armature phase windings may be directly and permanently connected with a lead of a corresponding generator armature phase winding, and leads of the other two-phase windings of the generator armature and motor armature may be connected through a reverser housed in a pair of casings 36 symmetrically mounted on the quill 25. The reverser comprises a pair of double pole switches 37 and 38 spring-biased toward open positions but operable to close the reversing connections by solenoids 39 and 40 each including a pair of coils 39', 39'' and 40', 40''.

One coil 39' of the solenoid 39 is in a line connecting the generator and motor windings and keeps the switch 37 closed when the motor is rotating in the same direction as the generator. The coil 39'' of the solenoid 39 is in a D. C. circuit connected through slip rings 42 and 44, and brushes 42', 44', and a remote control reversing switch 43 with a source of D. C. current.

One coil 40' of the solenoid 40 is in a line connecting the generator and motor windings and keeps the switch 38 closed when the motor is rotating reversely to the direction of rotation of the generator. The coil 40'' of the solenoid 40 is in a D. C. circuit connected through the slip rings 41 and 42 and brushes 41', 42' with the switch 43 and therethrough with a source of D. C. current.

By including in the solenoids 39 and 40 a few ampere turns energized by the main phase current sufficiently to hold the switches 37 and 38, even if a control circuit should be opened by accident or mistake, damage to the mechanism may be prevented, since such switches 37 and 38 would not open unless and until the excitation of the generator field is reduced almost to zero, even if a circuit controlled by the switch 43 should fail.

The motor stator or field member, complementary to and axially overlying the motor armature, comprises an outer low resistance squirrel cage, composed of copper bars 45, and an inner high resistance squirrel cage, composed of alloy bars 46. The bars of the outer squirrel cage are seated in the slots 47 of a secondary laminated core 48, fixed to the frame 4, and the bars of the inner squirrel cage are mounted in the core slots 49, which are connected with the slots 47 by narrow slots 50 providing narrow air gaps between the respective sets of bars.

The double squirrel cage stator is slotted and contains pairs of bars 45 and 46 connected by end rings 51 and 52. The stator is symmetrical and has no connections determinative of the relative directions of the current flow. The currents induced in the bars 45 and 46 and the number of poles produced are determined by the windings 35 in the rotor slots 34 in which the polyphase current sets up a rotary magnetic field.

As illustrated, three-phase windings 35 are arranged in the slots 34 to provide such number of poles or magnetic fields proportionately to the number of generator poles 11 as is requisite to provide and maintain the desired ratio of speed relatively to the slip of the generator and hence relatively to the speed of the driving shaft 1. For example, following any standard armature system, windings may be wound therein to provide eight, fourteen, or sixteen poles, or windings may be wound therein to provide ten or twenty poles. If the windings 35 are so arranged as to provide eight poles, the speed ratio resulting from the proportioned number of poles in the motor and generator will be substantially one to two and the torque ratio will be substantially two to one.

It will be understood that in the operation of the embodiment of my invention shown in Figs. 1 and 2, by way of illustration of the principles thereof, the field windings of the four salient poles of the driving rotor of the generator are energized by exciting current through the slip rings 16 and 17. When the exciting current flows in the windings, magnetic flux flows in opposite directions from or into the successive poles to create magnetic fields cut by the conductors of the three-phase armature windings 29 in the slots 30 of the generator core 27, which is also a rotor.

The magnetic attraction between the generator members causes them to act as a magnetic slip clutch through which a part of the energy imparted to the driving rotor from the driving shaft 1 is transmitted magnetically to the generator armature and through the quill 25 and spider 23 to the driven shaft 8.

The torque thus imparted to the shaft 8 is equal to the product of the magnitude of the coupling effect of the magnetic force and the "arm" of radial distance through which such effect is applied to the shaft 8.

If the magnitude of the coupling effect of the magnetic forces between the field and armature members were sufficient to produce relative immobility between the field and armature members, the speed of the driven member would be the same as and be controlled by the driving member, since the kinetic energy and speed of such members would be substantially the same. Under such conditions the torque of the driven member cannot exceed the torque of the driving member, no electric current can be generated, and the driven member cannot be rotated reversely to the driving member.

In accordance with our invention, the coupling effect of the magnetic forces between the armature and field members is so limited as to maintain relative rotation between the field and armature members sufficient to generate an electric current of sufficient magnitude to electrokinetically control the speed of the driven shaft and to exert, through the dynamo-electric mechanism described, torque on the driven member in addition to the torque applicable thereto through the magnetic coupling. Such torque constitutes the governing force applied to the driven member and regulates the speed and direction of rotation thereof and consequently the rate of slip between the armature and field members.

By transforming the energy of the generated current into mechanical energy through a constant speed motor or multi-speed motor, a substantially constant inverse ratio or series of inverse ratios of speed and torque may be maintained between the speed and torque of the driven shaft and the speed and torque of the driving shaft, within the capacity of the units, so long as the coupling effect of the magnetic coupling is maintained constant by a constant supply of exciting current to the generator field elements.

Preferably the magnetic interlinkage between the generator members is so controlled that less than one-half the energy of the shaft 1 is transmitted through the magnetic coupling to the shaft 8 and the remaining energy of the shaft is electro-kinetically transmitted to the shaft 8. To do this, the remaining energy of the shaft 1 is first transformed into electric current by the lag of the armature behind the speed of rotation of the field, with consequent relative rotation of the armature and field members and cutting of the field to generate a three-phase alternating output current in the generator armature windings 29 which is fed to the motor armature windings 35 under control of the reverser 36. The electric energy is reconverted by the motor into mechanical force having a magnitude and arm whose product is greater than the product of the magnitude and arm of the force of the magnetic coupling. Hence upon the operation of the reverser 36 to interchange the phase circuits and reverse the direction of motor operation, the shaft 8 is rotated oppositely to the shaft 1, with consequent greater slip speed between the elements of the generator and the delivery of more electrical energy to the motor to augment its action.

In the embodiment of our invention illustrated in Figs. 3 to 9, inclusive, a prime mover, such as a high speed Diesel engine 100 (Fig. 9), has a chank shaft 101 on one end of which is fixed a rotor 102 of an alternator or a synchronous generator. The rotor includes, say, twelve salient poles 103 (Figs. 5, 6) each surrounded by a field coil 104 and capped by a damper winding 105 above the pole shoe. The coils on adjacent poles are oppositely wound so that the passage of exciting direct current therethrough provides magnetic fields rendering consecutive pole shoes of opposite polarity to one another.

The field windings are connected with slip rings 106 and 107, to which exciter current may be supplied through brushes 108 and 109 and conductors 110 and 111 from direct-current bus bars 112 and 113 of a panel board. A switch 114 and a rheostat 115 permit the field circuits to be closed or broken.

The bus bars 112 and 113 may be energized from any suitable source, as for instance, from a Diesel-driven exciter 116 through the conductors 117 and 118 and switch 119, when the Diesel 100 is at rest, or through the conductors 120 and 121 and switch 122 from the D. C. generator 123, driven by the crank shaft 101, when the Diesel 100 is in operation.

The field poles 103 are axially overhung (Fig. 6) by armature windings 124 seated in slots 125 of a ventilated laminated core 126. The core 126 is mounted on the inner periphery of a cylindrical spider 127 projecting axially from a flange or disc 128 fixed on the propeller shaft 129. When desired, the shaft 129 may be held against rotation by any suitable form of brake 130 (Fig. 9).

The armature windings 124 are wound in three-phase relationship to one another and the respective phase windings are connected (Fig. 7) through the conductors 131, 132 and 133 with the respective slip rings 134, 135 and 136 insulated from one another and mounted on the brackets carried by the spider 128.

The slip rings are engaged (Figs. 4, 7) by the respective brushes 137, 138 and 139, which are connected respectively through conductors 140, 141, 142 with the terminals of a stationary reverser 143.

The reverser 143 is connected through the conductors 144, 145 and 146 with stator windings 147 of a polyphase double squirrel cage motor; such windings being seated in slots 148 of a ventilated, laminated stationary core 149 mounted on a housing 150, which may enclose the entire mechanism (Fig. 6).

The windings 147 are preferably wound three-phase so that the passage therethrough of three-phase alternating current from the generator sets up a rotating flux corresponding to twenty-four poles. The windings 147 are complementary to a double squirrel cage rotor mounted on the exterior periphery of the quill 127 and comprising a laminated ventilated core 151 for the reception of the inner copper bars 152 and the outer alloy bars 153. The bars are connected by the side rings on the ends of bars 152 and 153, forming a double end ring construction.

The field and armature members of the motor and the armature member of the generator axially overlie one another and overlie the field member of the generator. No internal pilot bearings are required and there is no mechanical connection between or affecting the alignment of the respective shafts 101 and 129.

The conductors 140, 141, and 142 leading from the generator windings (Fig. 9) may be connected through a switch 156 with the panel-board bus A. C. bars 157, 158, and 159. The conductors 144, 145, and 146 leading from the reverser 143 to the motor windings may be controlled by a switch 143'.

The bus bars 157, 158, and 159 may be connected through suitable conductors 160, 161, and 162 to auxiliary current consuming equipment such as the motors of anchor winches, derricks, dredges, illuminating systems or the like.

The bus bars 157, 158, and 159 may be additionally energized from an auxiliary power plant, consisting of a Diesel 163 and three-phase generator 164, through the conductors 165, 166 and 167 and switch 168. The field of the generator 164 may be excited from the bus bars 112 and 113 through the branch conductors 169 and 170 controlled by a switch 171.

In starting up the power plant, the shaft 129 may be locked against rotation by the brake 130 so as to hold the quill 127 against rotation and enable the windings 124 and core 126 to function as a polyphase-motor to crank the Diesel 100. With all the switches open, the auxiliary Diesel 163 and the exciter 116 are placed in operation; the switches 119 and 171 being then closed to provide exciter current to the generator 164. When the generator 164 has attained normal operating speed, the field excitation of the generator 164 is boosted and the switches 168 and 156 are closed to supply current through the brushes 137, 138 and 139 and slip rings 134, 135, and 136 to the three-phase windings 124. The coils of the windings 124 are so connected that the passage of alternating current therethrough sets up a rotating flux corresponding to poles. The rotating flux proceeding around the now stationary core 126 crosses the air gap between the core and the poles 103 and exerts torque sufficient to turn and start the Diesel 100.

When the Diesel has been started, the switch 122 may be closed and the switches 119, 171 and 168 opened. The rheostat 115 may be adjusted to a position where the rotation of the rotor 102 by the crank shaft 101 will generate in the windings 124 current for energizing the bus bars 157, 158 and 159 for operating auxiliary ship equipment, if desired.

When power from the Diesel 100 is to be transmitted to the propeller shaft 129, the brake 130 is released, the rheostat 115 is moved to open or nearly open position, the reverser 143 is placed in forward position, and the switch 143' is closed.

The rheostat 115 is then adjusted until the field coils 104 are sufficiently excited that their rotation relative to the coils 124 generates current therein and establishes a magnetic interlinkage between the fields of the windings 104 and 124 sufficient to impart, through magnetic drag, rotation to the quill 127 and therethrough transmit to the driven shaft 129 a part of the kinetic energy of the shaft 101.

The current generated in the coils 124 flows through the conductors described and the reverser 143 to the stator windings 147, whose coils are so connected that the three-phase alternating current passing therethrough sets up a rotating flux corresponding to poles. As this rotating flux proceeds around the stator circumference, it crosses the air gap from the stator to the rotor under one pole and from the rotor to the stator under the next pole so as to induce in the bars or conductors 152 and 153, cut by the flux, a definite voltage which is in one direction under one pole and in the opposite direction under the next pole; thereby creating complementary magnetic fields or poles.

The flow of the current, generated in the windings 124, through the windings 147 thus imparts rotation to, and controls rotation of, the quill 127 so that the rate of rotation of the quill 127 bears a constant ratio to the slip rate of the generator and to the rate of rotation of the shaft 101. Similarly, the torque imparted electro-kinetically to the shaft 129 through the elements 147, 152 and 153 governs the torque imparted to the shaft 129 magnetically through the elements 104 and 124.

Such torque and speed characteristics result from the fact that the product of the "arm" and the magnitude of the force transmitted electro-kinetically equals or exceeds the product of the "arm" and the magnitude of the force transmitted magnetically.

In this instance, and generally, the "arm" of the electro-kinetically transmitted force exceeds the "arm" of the magnetically transmitted force, due to the difference in the radii of the points at which the respective forces are applied. In this instance, and generally, the magnitude of the force transmitted electro-kinetically exceeds the magnitude of the force transmitted magnetically, due, in this instance, primarily to the fact that the poles of the motor are greater in number than the poles of the generator.

By way of example, it may be assumed that a 1000 H. P. Diesel engine 100 normally rotates the D. C. excited, twelve salient pole field member 102 at 720 R. P. M. and that it is desired to drive the propeller shaft at about one-third the speed of the driving rotor. The winding 124 can be a twelve pole modified wave, with two conductors per slot, star connected and with normal flux densities to generate 950 volts line to line.

When the quill 127 is stationary, as for instance when the propeller shaft is held by the brake, the rotation of the field member 102 at 720 R. P. M. generates the equivalent of 1000 H. P. (less efficiency) at a frequency of aproximately 72 C. P. S., viz.:

$$f = \frac{720 \times 12}{120}$$

Auxiliary equipment on the ship may be designed for utilizing current at such frequency.

When the quill 127 rotates, the effective generator speed is reduced from 720 by the number of R. P. M. of the quill 127. At the desired tail shaft speed of 240 R. P. M. the effective generator speed would be 480 R. P. M.; the frequency of the generated current would be approximately 48 C. P. S., viz., $$f = \frac{480 \times 12}{120}$$

and the power generated would be $480/720 \times 1000$, or approximately 667 H. P. or 500 kw. (less efficiency). The remaining energy of the shaft 101, approximating 333 H. P., is transmitted, with substantially no loss, magnetically from the member 102 to the armature members 124, 125, and 127.

The voltage generated in the windings 124 causes a current to circulate through the stationary windings 147, which are so wound that a rotating flux is set up, corresponding to twenty-four poles, and at forty-eight cycles per second this tends to rotate the double squirrel cage rotor 151, 152, 153 at 240 R. P. M., viz., $$s = \frac{120 \times 48}{24}$$

At full load, the speed of the motor might drop to approximately 233 R. P. M., so that the actual full load operating speed of the motor, driven shaft, and magnetically driven member of the magnetic clutch would be in the neighborhood of 237 R. P. M. Consequently there results reduction of approximately three to one, an increase in torque of approximately three to one, with an operating efficiency of 90% or more.

When the reverser 143 is operated to interchange the circuits to reverse the direction of motor rotation, the torque of the motor is applied to the shaft 129 in a direction opposite to the direction of the torque imparted thereto by the magnetic coupling. Hence the energy of a unidirectional prime mover may be applied to a driven shaft simultaneously in opposite directions, but the greater torque applied through the motor overcomes the torque applied through the magnetic coupling and turns the quill 127 and the driven shaft reversely to the direction of rotation of the driving rotor 102. The generator slip speed and current generated are increased by the movements of the generator elements in opposite directions, thereby increasing the frequency of the current and hence the reverse speed of the motor as compared with its forward speed if the number of active poles in both dynamo electric machines remain the same.

For example, in the above illustration, the reverse speed of the motor rotor relative to the motor stator may be considered $x$ R. P. M., and the slip speed between the two rotors of the generator would therefore be 720 plus $x$. Applying the formula $$f = \frac{ps}{120}$$

the frequency of the generated current at a speed of $720+x$ would be $$f = \frac{12(720+x)}{120} = \frac{720+x}{10}$$

To determine a value of $x$, the same formula may be applied to the motor, whose speed is $x$, to secure the equation $$f = \frac{24x}{120} = \frac{x}{5}$$

Since the frequency at which the current is utilized is substantially the same as the frequency generated, $$\frac{x}{5} = \frac{720+x}{10}$$

or $x=720$; viz., the theoretical motor speed.

If it were desired to secure a lower forward tail-shaft speed, of say 120 R. P. M. under constant duty, with the same engine and generator, the slip speed between the generator rotors would be 600 R. P. M. and a motor having 60 poles would be required to maintain the desired forward tailshaft speed. This is determinable as follows:

Generator output:

$$f = \frac{ps}{120} = \frac{(12)(600)}{120} = 60 \text{ C. P. S.}$$

Motor poles required:

$$p = \frac{120f}{s} = \frac{(120)(60)}{120} = 60 \text{ poles}$$

Motor speed:

$$s = \frac{120f}{p} = \frac{(120)(60)}{60} = 120 \text{ R. P. M.}$$

To determine the approximate theoretical reversing speed of the motor, the reverse speed of the motor rotor relative to its stator may be considered $y$ R. P. M. The slip speed of the generator during reversing would therefore be 720 plus $y$. Applying the formula $$f = \frac{ps}{120}$$

the frequency of the generated current would be $$f = \frac{12(720+y)}{120} \text{ or } \frac{720+y}{10}$$

To determine the value of $y$, the same formula may be applied to the motor to secure the equation $$f = \frac{60y}{120} = \frac{y}{2}$$

Since the frequency of the current utilized is substantially the same as the frequency generated, $$\frac{y}{2} = \frac{720+y}{10}$$

or $y=180$; viz., the theoretical reversing speed of the tailshaft.

It will be understood that any desired speed reduction may be provided by suitably proportioning the number of active poles of the generator and motor either in the inherent design of the apparatus or by rendering inactive certain of the poles of the generator or of the motor and that the direction of rotation of the driven shaft may be reversed provided its forward speed is less than half the speed of the driving rotor. The higher the ratio between the driving and driven shaft speeds, viz., the slower the driven shaft is relatively to the driving shaft, the closer the forward and reverse speeds of the driven shaft will approach one another.

In carrying out our invention, the motor may be so constructed that its back E. M. F. is high relative to the applied voltage so that a high percentage of the electrical energy applied from the generator is effectively utilized and there are but small heat losses. Where D. C. types of dynamo-electric machines are utilized in the practice of our invention, the back E. M. F. per revolution of the motor may be made greater than the E. M. F. per revolution of the generator by making the product of the factors $$\frac{\phi PZ}{p10^8}$$

of the former greater than the product of such factors of the latter, when $\phi$ is the total flux entering the armature from one north pole, P the number of poles, Z the number of conductors on the surface of the armature and $p$ the parallel paths through the armature.

Having described our invention, we claim:

1. The combination with an electric generator having differentially rotatable members forming a magnetic slip coupling and including field and armature elements generating electro-motive force when said members are differentially rotated, of an electric motor surrounding said generator elements and having members one of which is rotatable relatively to the other and including field and armature elements generating back-electromotive force per revolution greater than the electromotive force generated by said generator per relative revolution of its members said generator and motor elements including means forming two annular sets of primary magnetic circuits which are not mutual to one another, means mechanically coupling the rotatable member of said motor with one of the rotatable members of said generator, and means forming an electric circuit common to the generator and motor and linking said sets of magnetic circuits and supplying output current from said generator to said motor, the effective force of said motor being applied through a radial "arm" greater than the radial "arm" through which the magnetic slip coupling acts.

2. The combination with an electric generator having driving and driven members comprising members rotatable about an axis and including pole and armature elements, both of which are rotatable and form a magnetic slip coupling, of an electric motor surrounding said generator elements and having members one of which is rotatable relatively to the other and including field and armature elements more distant radially than said generator elements from said axis, means mechanically coupling the rotatable member of the motor to one of the rotatable members of said generator, and means for supplying to said motor current generated by said generator, said generator and motor elements including windings in a common electric circuit and forming a greater number of magnetic poles in the motor than in the generator, said poles being so related that the frequency of current generated by the generator according to the formula $$f = \frac{sp}{120}$$

produces a motor speed according to the formula $$s = \frac{120f}{p}$$

maintaining a substantially constant reduction ratio between said driving member of the generator and the rotatable member of the motor.

3. A torque converter comprising a pair of dynamo-electric machines having a common rotor rotatable about an axis, one of said machines having a stator and being wound as a constant speed motor controlling the speed of said common rotor and the other of said machines having a field rotor within said first named rotor and forming therewith a magnetic slip coupling, said last named machine being wound as a higher speed generator and supplying generated current to said motor, the windings of said machines being in a common electric circuit, the windings of each machine being magnetically complementary to poles of that machine only and the poles of each machine being in primary magnetic circuits which are not mutual to primary magnetic circuits of the other machine, the motor poles being spaced radially further than the generator poles from said axis and the poles of said machines being so related on the rotation of said rotors that $fg$ always approximates $fm$, $fg$ equals $$\frac{(S_1-S_2)p_g}{120}$$

and $fm$ equals $$\frac{S_2 p_m}{120}$$

when $fg$ stands for generator frequency, $fm$ stands for motor frequency, $S_1$ stands for field rotor speed, $S_2$ stands for common rotor speed, $p_g$ stands for number of generator poles and $p_m$ stands for number of motor poles.

4. A torque converter comprising a pair of dynamo electric machines having a common rotor, one of said machines being wound as a constant speed motor controlling the speed of said rotor and the other of said machines being wound as a magnetic slip coupling and generator of higher speed than said motor, said generator being housed within and discharging output electric current to said motor, said machines including sets of windings in a common electric circuit and generating sets of primary magnetic circuits which are not mutual to one another, at least one of said sets being mounted on said rotor and the magnetic flux generated thereby completing its effective circuit through one of the machines only and the remainder being concentric therewith and disposed in the approximate axial zone of said rotor set of windings, and the magnetic flux generated thereby completing its effective circuit through the other of said machines only.

5. A torque converter comprising a pair of dynamo electric machines having a common rotor, one of said machines being wound as a constant speed motor controlling the speed of said rotor and the other of said machines being wound as a magnetic slip coupling and higher speed alternator having a rotor provided with poles rotatable within said first named rotor, said alternator discharging output electric current to said motor, said machines including concentric sets of phase windings disposed within approximately the same axial zone and electrically connected with one another, said windings forming loops spaced radially from one another.

6. A torque converter comprising a pair of dynamo electric machines having a common rotor, one of said machines being wound as a synchronous motor controlling the speed of said rotor and the other of said machines being wound as a magnetic slip coupling and higher speed alternator surrounded by said motor, said machines including a plurality of sets of windings mounted on said rotor and forming loops radially spaced from one another, and the inner windings discharging output electric current to the outer winding.

7. A torque converter comprising a pair of dynamo electric machines having a common rotor, one of said machines being wound as a motor controlling said rotor, and the other of said machines being wound as a generator and discharging output electric current to said motor, said motor windings forming a greater number of effective magnetic poles than said generator embodies, the poles of the motor and generator being concentrically arranged and lying within approximately the same axial zone.

8. A torque converter comprising a generator and a motor each having a primary and a secondary, the secondary of the generator and the primary of the motor having elements forming a closed electrical circuit containing sets of loops radially spaced from one another and being concentrically positioned in approximately the same axial zone, and the primary of the generator and motor each having a fixed number of poles, and the poles of the primary of the motor being energized by the outer set of loops and being greater in number than the poles of the primary of the generator.

9. A propulsion system comprising a prime mover having a rotary member, a driven shaft, and means comprising a plurality of coaxial dynamo-electric machines forming a generator and a motor, said motor having a greater number of poles than said generator and transmitting rotation to said shaft reversely to the direction of rotation of said member, said generator including armature and field members both of which rotate during the rotation of said shaft to supply generated current to said motor and form a magnetic slip coupling of lesser effective arm than said motor.

10. Power transmitting mechanism comprising complementary differentially rotatable members including field and armature elements forming a magnetic slip coupling and a generator, a constant speed motor surrounding said generator and having constantly during normal operation a greater torque than said coupling and comprising members one of which is rotatable relatively to the other and including field and armature elements, said last named rotatable member being mechanically connected with one of said first rotatable members, and means for conducting the output current of said generator to said motor, said motor having a greater number of field elements than said generator and a speed constantly less than half that of said generator field element and in substantially constant ratio thereto independent of applied load within the capacity of the mechanism.

11. A torque converter comprising a pair of dynamo-electric machines having a common rotor, one of said machines being wound as a multi-speed motor operable at any one of two or more definite speeds each practically independent of the load and the other of said machines forming a magnetic slip coupling and being wound as a generator of higher speed and lesser arm than the maximum speed and arm of said motor and discharging output current to said motor, said machines including sets of windings, at least one of said sets being mounted on said rotor and the remainder being concentric therewith and disposed in the approximate axial zone of said rotor set of windings.

12. A torque converter comprising a pair of dynamo-electric machines having a common rotor rotatable about an axis, one of said machines being wound as a phase wound motor having poles and the other of said machines being wound as a phase wound generator of higher speed and having a lesser number of poles than said motor and forming a magnetic slip coupling, the motor poles being radially farther than the generator poles from said axis and the motor force acting through a greater arm than does the magnetic slip coupling, and conductors connecting phase windings of the motor with complementary phase windings of the generator to supply generator output current to the motor and including a reverser for changing the connections of said phase windings to reverse said motor.

13. Power transmitting mechanism comprising a generator having complementary field and armature members both of which are rotatable, a motor supplied with current from said generator and having complementary field and armature members, the field of said motor including a greater number of poles than the field of said generator, one of said motor members being mechanically connected with one of said generator members, and a reverser rotatable with said connected members for controlling the direction of rotation of said motor.

14. A torque converter comprising a generator and a motor having a common rotor, a reverser connecting said generator and motor, and a reverser-controller rotatable with said rotor.

15. A torque converter comprising a generator and a motor each having field members disposed in substantially the same axial zone, a reverser connecting said generator and motor, and a reverser-controller controlled by output current of said generator.

16. Electrical apparatus comprising a pair of dynamo electric machines having a common rotor, said machines including means forming two annular sets of primary magnetic circuits which are not mutual to one another, one of said machines being wound as a motor having windings forming poles and the other of said machines being wound as a magnetic slip coupling and generator having windings electrically connected with the windings first named and forming therewith an electric circuit common to the generator and motor and linking said sets of magnetic circuits, said windings of at least one of said machines being carried by said common rotor, said generator having a smaller number of poles than the number of poles formed by said windings of said motor and said machines each having elements complementary to the respective windings thereof and disposed within approximately the same axial zone.

17. Electrical apparatus as set forth in claim 16 in which the motor is wound as a constant speed motor having a squirrel cage on said common rotor.

18. Electrical apparatus as set forth in claim 16 in which the motor is wound as a constant speed motor having a squirrel cage on the stator surrounding said common rotor.

19. Electrical apparatus comprising a pair of dynamo electric machines having a common rotor, one of said machines being wound as a motor having windings on the outer periphery of said common rotor and forming poles and the other of said machines being wound as a magnetic slip coupling generator having windings on the inner periphery of said rotor and surrounded by and electrically connected with the windings first named and forming therewith an electric circuit common to the generator and motor and linking the magnetic circuits thereof, means forming a rotating generator field within said common rotor, said motor having a greater number of poles and a greater leverage arm than said generator and regulating the rate of rotation of said common rotor.

20. Electrical apparatus comprising complementary differentially rotatable members including field and armature elements forming a magnetic slip coupling and a generator, a constant speed motor surrounding said generator and having constantly during normal operation a greater torque than said coupling and comprising members one of which is rotatable relatively to the other and including field and armature elements, said last named rotatable member being mechanically connected with one of said first named rotatable members, and said generator having its output terminals electrically connected with the input terminals of said motor, said motor having a greater number of pole forming elements than said generator and an operating speed less than half the speed of the field element of said generator and in a substantially constant ratio thereto independently of applied load within the capacity of the mechanism.

THOMAS D. BOWES.
FRED SCHULTE.

REFERENCES CITED

The following references are of record in the file of this patent:

UNITED STATES PATENTS

| Number | Name | Date |
| --- | --- | --- |
| 805,416 | Esmond | Nov. 21, 1905 |
| 912,144 | Mavor | Feb. 9, 1909 |
| 925,504 | Porsche | June 22, 1909 |
| 993,611 | Midgley et al. | May 30, 1911 |
| 1,246,643 | Neuland | Nov. 13, 1917 |
| 1,410,215 | Neuland | Mar. 21, 1922 |
| 1,676,028 | Heany | July 3, 1928 |
| 1,848,091 | Winther | Mar. 1, 1932 |
| 1,893,346 | Winther et al. | Jan. 3, 1933 |
| 2,065,073 | Jacklitch | Dec. 22, 1936 |

FOREIGN PATENTS

| Number | Country | Date |
| --- | --- | --- |
| 6,805 | Great Britain | 1915 |
| 128,195 | Great Britain | 1920 |
| 227,683 | Great Britain | 1925 |
| 704,578 | France | Feb. 23, 1931 |